(12) United States Patent
Hermann

(10) Patent No.: US 8,523,541 B2
(45) Date of Patent: Sep. 3, 2013

(54) PLASTIC ELEMENT, PISTON PUMP, AND ASSEMBLY METHOD

(75) Inventor: Harald Hermann, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 12/741,700

(22) PCT Filed: Oct. 13, 2008

(86) PCT No.: PCT/EP2008/063742
§ 371 (c)(1),
(2), (4) Date: May 6, 2010

(87) PCT Pub. No.: WO2009/059871
PCT Pub. Date: May 14, 2009

(65) Prior Publication Data
US 2010/0247358 A1 Sep. 30, 2010

(30) Foreign Application Priority Data
Nov. 6, 2007 (DE) .......................... 10 2007 052 756

(51) Int. Cl.
*F04B 53/12* (2006.01)
*F04B 39/10* (2006.01)

(52) U.S. Cl.
USPC ........ 417/549; 417/470; 417/545; 137/15.19; 137/315.33; 137/539

(58) Field of Classification Search
USPC ............ 417/470, 545, 549, 319; 137/315.33, 137/15.19, 15.18, 539
See application file for complete search history.

(56) References Cited

U.S. PATENT DOCUMENTS

| | | | | |
|---|---|---|---|---|
| 4,506,695 A | * | 3/1985 | Kuypers | 137/223 |
| 4,983,100 A | * | 1/1991 | Budecker | 417/271 |
| 5,823,639 A | * | 10/1998 | Zinnkann et al. | 303/116.4 |
| 6,042,350 A | * | 3/2000 | Beck | 417/549 |
| 6,093,003 A | * | 7/2000 | Hauser et al. | 417/541 |
| 6,109,896 A | * | 8/2000 | Schuller et al. | 417/549 |
| 6,171,083 B1 | * | 1/2001 | Schuller | 417/549 |
| 6,217,300 B1 | * | 4/2001 | Schuller et al. | 417/549 |
| 6,276,909 B1 | * | 8/2001 | Siegel et al. | 417/549 |
| 6,283,733 B1 | * | 9/2001 | Merklein et al. | 417/549 |
| 6,302,663 B1 | * | 10/2001 | Schuller et al. | 417/554 |
| 6,340,295 B1 | * | 1/2002 | Hauser et al. | 417/470 |
| 6,652,245 B2 | * | 11/2003 | Hauser et al. | 417/313 |
| 7,390,174 B2 | * | 6/2008 | Dinkel et al. | 417/549 |
| 7,690,899 B2 | * | 4/2010 | Harada | 417/254 |
| 7,704,058 B2 | * | 4/2010 | Harada et al. | 417/549 |

(Continued)

FOREIGN PATENT DOCUMENTS

DE 3509260 A1 10/1985

*Primary Examiner* — Charles Freay
*Assistant Examiner* — Ryan Gatzemeyer
(74) *Attorney, Agent, or Firm* — Maginot, Moore & Beck

(57) ABSTRACT

The invention relates to a one-piece plastic element having an inlet valve cover and an inlet valve seat element for an inlet valve of a piston pump of a hydraulic brake system of a motor vehicle. The inlet valve is designed as a check valve, and the inlet valve cover and the inlet valve seat element are connected to each other by a designed fracture point. The invention further relates to a piston pump having an inlet valve cover and inlet valve seat element made of a one-piece plastic element. The invention further relates to a method for assembling the inlet valve designed as a check valve.

24 Claims, 1 Drawing Sheet

(56) References Cited

U.S. PATENT DOCUMENTS 7,891,959 B2 * 2/2011 Harada et al. ................. 417/470
2001/0002978 A1 * 6/2001 Siegel et al. .................. 417/470
2007/0092389 A1 * 4/2007 Dinkel et al. ................. 417/554
2008/0226479 A1 * 9/2008 Schuller et al. ............... 417/545

* cited by examiner

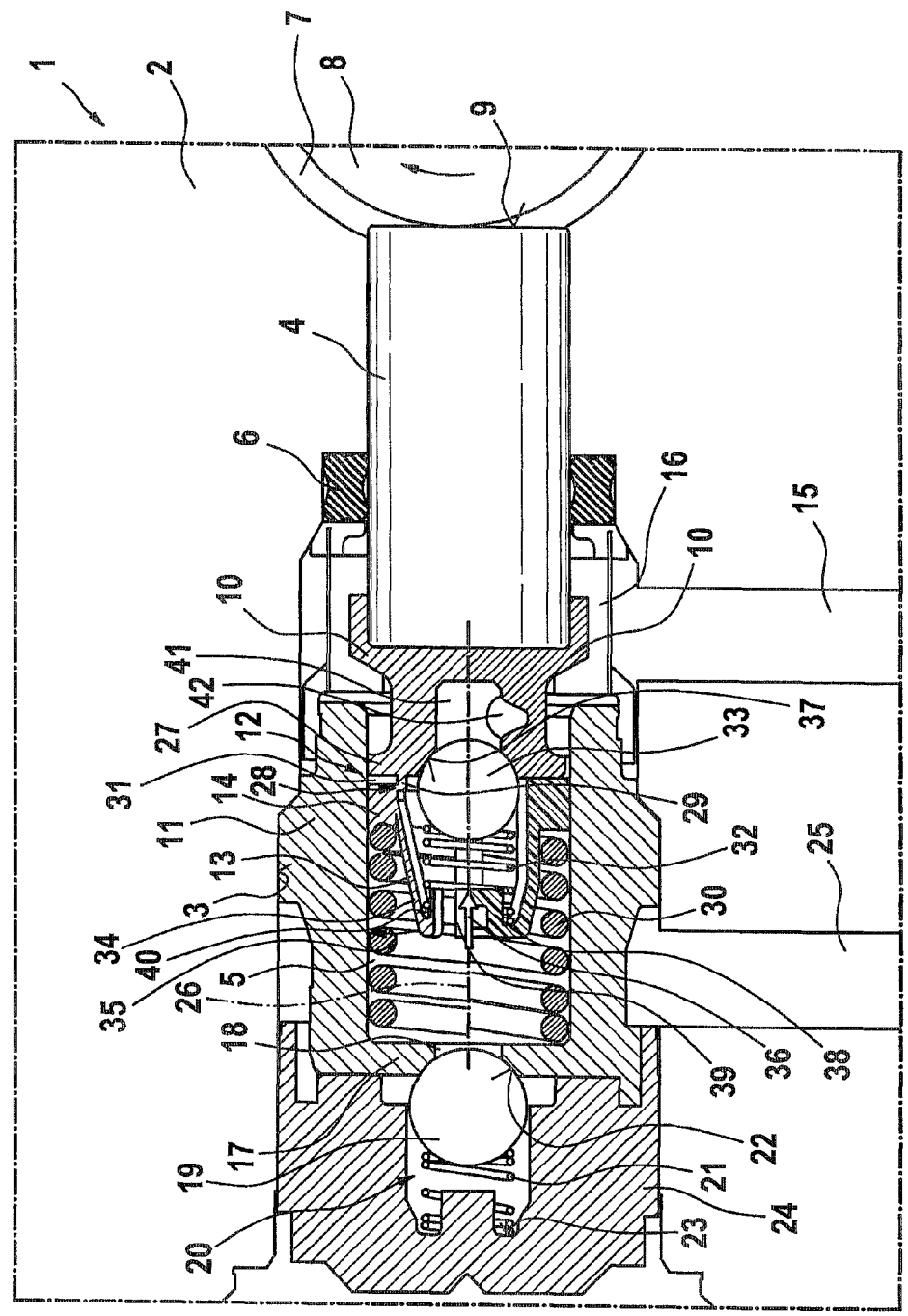

PLASTIC ELEMENT, PISTON PUMP, AND ASSEMBLY METHOD

CROSS-REFERENCE TO RELATED APPLICATION

This application is a 35 USC 371 application of PCT/EP2008/063742filed on Oct. 13, 2008.

BACKGROUND OF THE INVENTION

1. Field of the Invention

The invention relates to a one-piece plastic element as defined by claim 1, to a piston pump for a hydraulic brake system, and to an assembly method.

2. Description of the Prior Art

Piston pumps are used in hydraulic brake systems of motor vehicles and are often called return feed pumps. In a traction control mode, they serve to lower or raise the brake pressure in the wheel brake cylinders selectively so as to be able to regulate the brake pressure in the wheel brake cylinders.

German Patent Disclosure DE 197 327 70 A1 shows a piston pump with an inlet valve embodied as a check valve; the inlet valve has a cup-shaped inlet valve cap embodied as a deep-drawn sheet-metal part. The inlet valve cap is urged by spring pressure in the axial direction by means of a restoring spring for a pump piston. A closing spring element and a closing body are disposed inside the inlet valve cap. The closing body is urged by spring pressure by the closing spring element onto a valve seat, which is disposed on the face end of the pump piston.

Piston pumps have also become known in which the cup-shaped inlet valve cap is embodied as a plastic element, and in which the valve seat of the inlet valve is not disposed directly on the pump piston but rather on a separate inlet valve element from the inlet valve cap that is affixed to the pump piston. The assembly of the known piston pumps is complicated, since the inlet valve cap and the inlet valve element have to be installed separately from one another. Moreover, the production of the individual components (the inlet valve cap and the inlet valve element) is cost-intensive.

OBJECT AND SUMMARY OF THE INVENTION

The object of the invention is to propose an easily assembled piston pump whose components can furthermore be produced economically. The object is also to propose a plastic element as a component of a piston pump by the use of which element the assembly of the piston pump is made simpler. The object is furthermore to propose a simplified assembly method for a piston pump, in particular for the inlet valve of the piston pump.

The invention is based on the concept of manufacturing the plastic components that are separate in the operation of the piston pump, that is, the inlet valve cap and the inlet valve element, as a one-piece plastic element, and the one-piece plastic element has at least one rated breaking point by whose separation the plastic element is split into the components separate from one another, the inlet valve cap and the inlet valve element. The embodiment of the preferably cup-shaped inlet valve cap and of the inlet valve element in an initially one-piece plastic element, which is preferably split only during assembly, in particular automatically, by separation of the rated breaking point, into the inlet valve cap and the inlet valve element that is separate from the inlet valve cap, offers a number of advantages. For instance, manufacturing a one-piece plastic element is substantially more economical than separately manufacturing an inlet valve cap and an inlet valve element. Moreover, the assembly of a piston pump is facilitated substantially by the use of such a plastic element, since instead of two separate components, only a one-piece plastic element has to be manipulated. Moreover, the one-piece embodiment of the plastic element ensures that the components of it, the inlet valve cap and the inlet valve element, are embodied of exactly the same material, which is feasible only with difficulty in the case of separate manufacture. By this provision, an identical wear behavior of the components is guaranteed.

An embodiment of the one-piece plastic element in which this part is made as an injection-molded part is particularly advantageous. The manufacture of the plastic element as an injection-molded part makes it easily possible to adhere to close tolerances and to produce the plastic element as a mass-produced that can be made from bulk material.

An embodiment of the one-piece plastic element in which the at least one rated breaking point is embodied and/or disposed such that it is automatically opened upon assembly is advantageous. In particular, the thickness of material comprising the at least one rated breaking point (material attenuation) should be dimensioned such that the rated breaking point is separated in or by means of the subjection of the plastic element or of the inlet cap, which in particular is cup-shaped, to a spring force of a restoring spring for a pump piston of the piston pump. In other words, the at least one rated breaking point must be embodied as weak enough that the spring force of the restoring spring suffices to sever the rated breaking point and thus to split the plastic element into the inlet valve cap and the inlet valve element that is separate from the inlet valve cap.

In order, in a one-piece embodiment of the inlet valve cap and the inlet valve element, to enable assembly of the closing spring element and the closing body of the inlet valve, it is provided in a refinement of the invention that the inlet valve cap, which in particular is cup-shaped, has at least two circumferential wall portions, adjacent one another in the circumferential direction, of which at least one circumferential wall portion can be bent open, preferably elastically, in the radial direction. As a result of the bending open of at least one circumferential wall portion in the radial direction, an (axial) assembly opening is formed or widened, so that the closing body and the closing spring element of the inlet valve of the piston pump can be introduced in the axial direction into the one-piece plastic element.

Especially preferably, all the circumferential wall portions of the inlet valve cap are bendable open in the radial direction, preferably in such a way that after the bending-open operation and the assembly of the closing body and of the closing spring element, they automatically spring back, at least approximately, into their original position. An embodiment in which the circumferential wall portions in the region of their free end also each form a bottom portion of the inlet valve cap, on which the closing spring element of the inlet valve after its installation is preferably braced in the axial direction in order to urge the closing body in the direction of the inlet valve element by spring force, is especially preferred.

To ensure the easiest possible breaking open of the rated breaking point upon assembly of the one-piece plastic element, an embodiment of the plastic element is preferred in which the rated breaking point between the inlet valve cap and the inlet valve element is embodied as a radial connection between these two components or portions of the initially one-piece plastic element. An embodiment is especially preferable in which the inlet valve element, in the region of the rated breaking point, protrudes axially into the inlet valve cap.

If in a rated breaking point embodied in this way the inlet valve cap is subjected to force in the axial direction, for instance with the aid or the reinforcement of the restoring spring for the piston, then the rated breaking point breaks, and the inlet valve cap is displaced axially in the direction of the inlet valve element, until the inlet valve cap rests, in particular on the face end, on the inlet valve element.

With respect to the shaping of the at least one rated breaking point, there are various possibilities. In a first alternative, it is possible for instance to provide a single rated breaking point embodied as an encompassing ring. In a second alternative, it is feasible to provide a plurality of rated breaking points, adjacent one another in the circumferential direction, with the circumferentially adjacent rated breaking points preferably disposed on a circular ring.

An embodiment of the plastic element in which a high-pressure seal is disposed or integrally formed onto the inlet valve cap, which seal forms a unit with the inlet valve cap even after the separation of the rated breaking point, is especially advantageous. Preferably, the contact face of the restoring spring on the high-pressure seal is embodied such that besides an axial force component, a radial force component acts in the radial direction outward on the high-pressure seal, so that the high-pressure seal is urged with force radially outward onto a bush, opposite which the high-pressure seal then seals off a positive displacement chamber that receives the restoring spring.

The invention also discloses a piston pump for a hydraulic brake system of a motor vehicle that has an inlet valve which has an inlet valve cap and separate from it an inlet valve element. According to the invention, it is provided that the inlet valve cap and the inlet valve element are initially embodied in one piece and are joined together solely via at least one rated breaking point, and by separation of the rated breaking point the two components or portions are separated from one another, so that for the operation of the pump, an inlet valve cap and an inlet valve element that is separate from it and that cooperates with the closing body of the inlet valve, are furnished.

An embodiment of the piston pump or of the inlet valve of the piston pump, in which the closing spring element of the inlet valve, which is preferably embodied as a helical spring, in the installed state surrounds a central portion of the inlet valve cap is especially advantageous. In other words, in the assembled state of the piston pump, a preferably at least approximately cylindrical central portion protrudes axially into, the closing spring element. Thus the closing spring element prevents unintentional bending open of at least one circumferential wall portion of the preferably cup-shaped inlet valve cap.

The invention furthermore discloses an assembly method for assembling an inlet valve, embodied as a check valve, of a piston pump or to an assembly method, for assembling the piston pump. According to the invention, it is provided that an initially one-piece plastic element, described above in detail, is affixed preferably on its face end to a pump piston of the piston pump, and that the (then still) one-piece plastic element is moved axially relative to a restoring spring, or in other words the restoring spring and the plastic element are moved toward one another, so that they come into contact with one another, and that because of the forces operative then, the at least one rated breaking point of the plastic element is severed and thus the inlet valve cap and the inlet valve element are separated from one another.

An embodiment of the assembly method in which the closing body and the closing spring element of the inlet valve are installed before the method step of moving the restoring spring and the plastic element toward one another is especially advantageous. The installation of these components is preferably done such that at least one circumferential wall portion of the inlet valve cap is bent open in the radial direction, and that thereupon the closing body and the closing spring element are introduced, preferably in the axial direction, into the inlet valve cap. Preferably, this is followed by a restoration of the at least one circumferential wall portion radially inward, and the bending open of the circumferential wall portion preferably takes place spring-elastically, so that the circumferential wall portion bent open in the radial direction automatically, and preferably at least approximately completely, pivots back radially inward into its original position.

BRIEF DESCRIPTION OF THE DRAWINGS

Further advantages, characteristics and details of the invention will become apparent from the ensuing description of a preferred exemplary embodiment and in conjunction with the drawing, in which:

FIG. 1 shows a sectional view of a piston pump during assembly, in which an embodiment with a one-piece plastic element is shown above a longitudinal center axis, and an embodiment of the prior art, with an inlet valve cap that is separate from the inlet valve element from the very outset, is shown below the longitudinal center axis.

DESCRIPTION OF THE PREFERRED EMBODIMENT

In the sole drawing, FIG. 1, a piston pump 1 is shown. It is disposed in a hydraulic block 2, in which besides the piston pump 1, other components, not shown, of a hydraulic vehicle brake system that has traction control, such as solenoid valves, check valves and hydraulic reservoirs, are accommodated and interconnected hydraulically with one another. The hydraulic block 2 forms a pump housing of the piston pump 1. A multiply-stepped pump bore 3 is made in this hydraulic block 2.

The piston pump 1 has a pump piston 4, whose end remote from a positive displacement chamber 5 is sealed off by an annular seal 6 from an eccentric chamber 7. In the eccentric chamber 7, an eccentric element 8 is driven rotatably about an axis of rotation that extends perpendicular to the longitudinal direction of the pump piston 4, and the pump piston 4 rests with its face end 9, remote from the positive displacement chamber 5, on the circumference of the eccentric element 8, which drives the pump piston 4 in the axial direction.

Another end, oriented toward the positive displacement chamber 5, of the pump piston 4 is connected by nonpositive engagement to an inlet valve element 10 of plastic. That in turn is received, by its end toward the positive displacement chamber 5, in a bush 11 that is seated by a press fit in the pump bore 3. The press fit effects sealing between the inlet and outlet sides, or in other words between the low- and high-pressure sides of the piston pump 1.

A cup-shaped inlet valve cap 13 axially adjoins the inlet valve element 10 of the inlet valve 12 of the piston pump 1 and is embodied in one piece with a high-pressure seal 14, which rests radially on the inner circumference of the bush 11 and seals off the positive displacement chamber 5 both axially and radially from the pump inlet of the piston pump 1.

For the pump inlet, a central blind bore 41 is provided in the inlet valve element 10; this bore is intersected near its bottom by transverse conduits 42. The blind bore 41 and the transverse conduits 42 communicate with an inflow bore 15 in the hydraulic block 2, by way of which inflow bore brake fluid is delivered to the piston pump 1. To avoid the entry of particles into the piston pump, the brake fluid must, along its way from the inflow bore 15, radially inward into the inlet valve element 10, has to flow through an annular filter element 16.

An opening 18 is provided centrally in a bottom 17 of the bush 11 and is closable by a valve ball 19 of an outlet valve 20 embodied as a check valve. The valve ball 19 is urged by spring force in the axial direction by an outlet valve spring 21 against an outlet valve seat 22 disposed on the face end of the bush 11. The outlet valve spring 21 is braced for that purpose on one end on the bottom 23 of a central opening in a closure cap 24 and on the other on the valve ball 19. When the outlet valve 20 is open, brake fluid can flow out of the positive displacement chamber 5 to an outflow conduit 25 via a radial conduit, not shown.

In FIG. 1, below a longitudinal center axis 26, the embodiment of the inlet valve 12 of the prior art is shown. It can be seen that the cup-shaped inlet valve cap 13 is embodied as a separate component from the inlet valve element 10, and as a result the inlet valve element 10 and the inlet valve cap 13 have to be installed in separate installation steps.

In the plane of the drawing above the longitudinal center axis 26, the construction of a novel kind of inlet valve 12 is shown during assembly. It can be seen that the inlet valve element 10 and the inlet valve cap 13 are embodied as what (for the sake of clarity of the invention) is still a one-piece plastic element 27; the two portions of the plastic element 27, embodied as an injection-molded part, namely the inlet valve element 10 and the inlet valve cap 13 with a high-pressure seal are joined to one another via an annular rated breaking point 28, which is embodied as a radial connection between the inlet valve cap, or the high-pressure seal portion of the inlet valve cap 13, and the inlet valve element 10. For that purpose, in the vicinity of the rated breaking point 28, the inlet valve element 10 protrudes in the axial direction with an annular extension 29 into the inlet valve cap 13. Upon assembly, that is, when the one-piece plastic element 27 and a restoring spring 30, received in the positive displacement chamber 5 and embodied as a helical compression spring, for the pump piston 4 are moved toward one another, the rated breaking point 28 breaks open and is thus separated because of the operative forces, as a result of which the inlet valve cap 13 is moved by a distance predetermined by the width of a gap 31 in the direct toward the inlet valve element 10. In this final assembly position, not shown, the inlet valve cap 13 rests with its high-pressure seal 14, which relative to the positive displacement chamber diameter is secured with an oversize axially on a face end of the inlet valve element 10 and connects a brake fluid outlet from the positive displacement chamber 5 in both the radial and axial directions. In other words, after the rated breaking point 28 is severed, the circumferential gap 31, embodied as an annular groove, provided between the face end of the high-pressure seal 14 and the face end of the inlet valve element 10 is spanned. In the final assembly state, the high-pressure seal 14 of the inlet valve element 10 is widened in the radial direction by the restoring spring 30 by being braced on contact faces that are curved or oblique in some portions, so that sealing is ensured not only in the axial direction but in the radial direction as well. The final contact pressure of the high-pressure seals in the radial and axial directions is the result primarily of the fluid pressure upon a compression stroke of the pump piston 4.

For installation of a closing spring element 32, embodied as a helical compression spring, and of what in this case is a spherical closing body 33 of the inlet valve 12, before the moving toward one another of what until then is still the one-piece plastic element 27 and the restoring spring 30, at least one circumferential wall portion 34 of the cup-shaped inlet valve cap 13 is bent open radially outward in the direction of the arrow 35, so that an axial introduction opening for axially introducing the closing spring element 32 and the closing body 33 is formed in a region radially inside the inlet valve cap 13. By the formation or enlargement of this axial introduction opening, the closing body 33 and thereupon the closing spring element 32 are introduced axially in the direction of the arrow 36 into the inlet valve cap 13, so that the closing body 33 comes to rest on the inlet valve seat 37, shaped as the inside of a cone embodied on the face end of the inlet valve element 10. The at least one circumferential wall portion 34 thereupon pivots counter to the direction of the arrow 35 radially inward again, and the closing spring element 32 receives a central portion 38 of the inlet valve cap 13 into itself and thus prevents the circumferential wall portion 34 from being bent open again. Radially inside the central portion 38, an axially extending, central conduit 39 is formed, through which brake fluid can flow into the positive displacement chamber 5 when the inlet valve 12 is open. The closing spring element 32 is braced in the axial direction on an annular bottom portion 40 of the inlet valve cap 13, so that it can urge the closing body 33 against the inlet valve seat 37 by spring force.

The foregoing relates to the preferred exemplary embodiment of the invention, it being understood that other variants and embodiments thereof are possible within the spirit and scope of the invention, the latter being defined by the appended claims.

The invention claimed is:

1. A one-piece plastic element, including an inlet valve cap and an inlet valve element for an inlet valve embodied as a check valve of a hydraulic brake system of a motor vehicle, wherein the inlet valve cap and the inlet valve element are aligned along a common axis and are connected to one another via an integral rated breaking point configured so that the inlet valve cap is offset from the inlet valve element along the common axis.

2. The plastic element as defined by claim 1, wherein the plastic element is embodied as an injection-molded part.

3. The plastic element as defined by claim 2, wherein the rated breaking point is embodied and/or disposed such that upon assembly of a piston pump, and upon subjection to a spring force of a restoring spring for a pump piston of the piston pump, the rated breaking point is automatically separated.

4. The plastic element as defined by claim 3, wherein the inlet valve cap has at least two circumferentially adjacent circumferential wall portions, of which at least one is elastically bendable radially outward in order to embody a sufficiently large assembly cross section for the axial insertion of a closing body and of a closing spring element.

5. The plastic element as defined by claim 4, wherein the rated breaking point is embodied as an exclusively radial connection between the inlet valve cap and the inlet valve element.

6. The plastic element as defined by claim 5, wherein said inlet valve element has a surface facing said inlet valve cap and the rated breaking point is embodied as a ring extending from said surface toward said inlet valve cap.

7. The plastic element as defined by claim 6, wherein the inlet valve cap is embodied as a high-pressure seal.

8. A piston pump for a hydraulic brake system of a motor vehicle, having a pump piston which can be driven to execute an axial reciprocating stroke motion, and having an inlet valve, embodied as a check valve, with a closing spring element and a closing body, in which the closing spring element is braced in an axial direction on an inlet valve cap and by spring pressure urges the closing body in a direction of an inlet valve element that is separate from the inlet valve cap, the inlet valve cap and the inlet valve element being formed from a one-piece plastic element as defined by claim 7 by means of the separation of the rated breaking point, the one-piece plastic element being engaged to the piston prior to separation of the rated breaking point.

9. The piston pump as defined by claim 8, wherein the closing spring element is disposed surrounding a central portion of the inlet valve cap, wherein the central portion points axially in the direction of the closing spring element.

10. An assembly method for assembling an inlet valve, embodied as a check valve, of a piston pump of a hydraulic brake system of a motor vehicle, as defined by claim 8, comprising the following steps:
    fixation by positive and/or frictional engagement of the one-piece plastic element, including the inlet valve cap and the inlet valve element, which are joined together via the rated breaking point, on a pump piston of the piston pump; and
    moving a restoring spring for the pump piston and the plastic element toward one another until the rated breaking point of the plastic element is separated.

11. The assembly method as defined by claim 10, wherein at least one circumferential wall portion of the inlet valve cap is bent open radially outward, before the movement toward one another; and that next, a closing body and a closing spring element are inserted in the axial direction into the inlet valve cap.

12. The plastic element as defined by claim 1, wherein the rated breaking point is embodied and/or disposed such that upon assembly of a piston pump, and upon subjection to a spring force of a restoring spring for a pump piston of the piston pump, the rated breaking point is automatically separated.

13. The plastic element as defined by claim 1, wherein the inlet valve cap has at least two circumferentially adjacent circumferential wall portions, of which at least one is elastically bendable radially outward in order to embody a sufficiently large assembly cross section for the axial insertion of a closing body and of a closing spring element.

14. The plastic element as defined by claim 1, wherein the rated breaking point is embodied as an exclusively radial connection between the inlet valve cap and the inlet valve element.

15. The plastic element as defined by claim 1, wherein said inlet valve element has a surface facing said inlet valve cap and the rated breaking point is embodied as a ring extending from said surface toward said inlet valve cap.

16. The plastic element as defined by claim 1, wherein the inlet valve cap is embodied as a high-pressure seal.

17. A piston pump for a hydraulic brake system of a motor vehicle, having a pump piston which can be driven to execute an axial reciprocating stroke motion, and having an inlet valve, embodied as a check valve, with a closing spring element and a closing body, in which the closing spring element is braced in an axial direction on an inlet valve cap and by spring pressure urges the closing body in a direction of an inlet valve element that is separate from the inlet valve cap, the inlet valve cap and the inlet valve element being formed from a one-piece plastic element as defined by claim 1 by means of the separation of the rated breaking point, the one-piece plastic element being engaged to the piston prior to separation of the rated breaking point.

18. The piston pump as defined by claim 17, wherein the closing spring element is disposed surrounding a central portion of the inlet valve cap, wherein the central portion points axially in the direction of the closing spring element.

19. An assembly method for assembling an inlet valve, embodied as a check valve, of a piston pump of a hydraulic brake system of a motor vehicle, as defined by claim 17, comprising the following steps:
    fixation by positive and/or frictional engagement of the one-piece plastic element, including the inlet valve cap and the inlet valve element, which are joined together via the rated breaking point, on a pump piston of the piston pump; and
    moving a restoring spring for the pump piston and the plastic element toward one another until the rated breaking point of the plastic element is separated.

20. The assembly method as defined by claim 19, wherein at least one circumferential wall portion of the inlet valve cap is bent open radially outward, before the movement toward one another; and that next, a closing body and a closing spring element are inserted in the axial direction into the inlet valve cap.

21. The plastic element as defined by claim 1, wherein the integral rated breaking point is configured so that the inlet valve cap is axially offset from the inlet valve element along the common axis.

22. A one-piece plastic element, including an inlet valve cap and an inlet valve element for an inlet valve embodied as a check valve of a hydraulic brake system of a motor vehicle, wherein:
    the inlet valve cap and the inlet valve element are joined to one another via an integral rated breaking point; and
    the inlet valve cap has at least two circumferential wall portions, of which at least one is bendable radially outward in order to embody a sufficiently large assembly cross section for the axial insertion of a closing body and of a closing spring element into the inlet valve cap when it is joined to the inlet valve element.

23. The plastic element as defined by claim 22, wherein the rated breaking point is embodied as an exclusively radial connection between the inlet valve cap and the inlet valve element.

24. The plastic element as defined by claim 22, wherein said inlet valve element has a surface facing said inlet valve cap and the rated breaking point is embodied as a ring extending from said surface toward said inlet valve cap.

* * * * *